United States Patent
Ishida et al.

(10) Patent No.: US 10,480,638 B2
(45) Date of Patent: Nov. 19, 2019

(54) DRIVE TRANSMITTER AND IMAGE FORMING APPARATUS INCORPORATING THE DRIVE TRANSMITTER

(71) Applicants: Masahiro Ishida, Kanagawa (JP); Narumi Sugita, Kanagawa (JP); Naoki Matsuda, Kanagawa (JP)

(72) Inventors: Masahiro Ishida, Kanagawa (JP); Narumi Sugita, Kanagawa (JP); Naoki Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/131,667

(22) Filed: Sep. 14, 2018

(65) Prior Publication Data

US 2019/0011038 A1  Jan. 10, 2019

Related U.S. Application Data

(63) Continuation of application No. 14/736,091, filed on Jun. 10, 2015.

(30) Foreign Application Priority Data

Jun. 23, 2014 (JP) ................................. 2014-128391
Feb. 9, 2015 (JP) ................................. 2015-023306

(51) Int. Cl.
*G03G 21/18* (2006.01)
*F16H 57/04* (2010.01)
*G03G 21/16* (2006.01)

(52) U.S. Cl.
CPC ..... *F16H 57/0464* (2013.01); *G03G 21/1647* (2013.01); *G03G 21/1857* (2013.01)

(58) Field of Classification Search
None
See application file for complete search history.

(56) References Cited

U.S. PATENT DOCUMENTS

| | | | |
|---|---|---|---|
| 4,501,576 A | 2/1985 | Tanaka et al. | |
| 5,099,278 A * | 3/1992 | Sato | G03G 15/0126 399/343 |
| 5,214,472 A * | 5/1993 | Czuprynski | F16G 1/20 399/162 |
| 5,761,580 A * | 6/1998 | Harada | G03G 15/757 399/167 |

(Continued)

FOREIGN PATENT DOCUMENTS

| | | |
|---|---|---|
| JP | S58-88259 A | 5/1983 |
| JP | H11-028346 A | 2/1999 |

(Continued)

OTHER PUBLICATIONS

Billings,Applied Kinematics, 3d Ed., p. 266-267 (D. Van Nostrand Co. 1953).

(Continued)

*Primary Examiner* — Sevan A Aydin
(74) *Attorney, Agent, or Firm* — Harness, Dickey & Pierce, P.L.C.

(57) ABSTRACT

A drive transmitter includes a group of gears to which grease is applied, at least one gear of the group of gears being an internally toothed gear, multiple pulleys, and a drive belt wound around the multiple pulleys to drive the group of gears. An image forming apparatus includes the drive transmitter.

8 Claims, 9 Drawing Sheets

(56) References Cited

U.S. PATENT DOCUMENTS

| | | | |
|---|---|---|---|
| 5,905,927 A | 5/1999 | Inoue et al. | |
| 5,937,241 A * | 8/1999 | Kumar | G03G 21/105 399/111 |
| 6,234,931 B1 | 5/2001 | Kanekura | |
| 2003/0053819 A1* | 3/2003 | Nomura | G03G 15/0896 399/110 |
| 2004/0161261 A1 | 8/2004 | Kasahara et al. | |
| 2006/0165423 A1* | 7/2006 | Nishitani | G03G 15/0121 399/27 |
| 2007/0048016 A1 | 3/2007 | Moon | |
| 2007/0065181 A1* | 3/2007 | Ookushi | G03G 15/0896 399/222 |
| 2007/0147895 A1 | 6/2007 | Hayakawa | |
| 2008/0226345 A1* | 9/2008 | Yoon | G03G 21/1647 399/167 |
| 2009/0123194 A1* | 5/2009 | Hatano | G03G 15/0818 399/285 |
| 2011/0255883 A1* | 10/2011 | Fukuda | G03G 15/0896 399/24 |
| 2011/0262165 A1* | 10/2011 | Takeuchi | G03G 15/0896 399/67 |
| 2012/0099905 A1* | 4/2012 | Hatano | G03G 15/09 399/274 |
| 2013/0065725 A1 | 3/2013 | Matsuda et al. | |
| 2013/0322893 A1* | 12/2013 | Suzuki | G03G 15/0822 399/12 |
| 2014/0123796 A1 | 5/2014 | Ishida et al. | |
| 2014/0270851 A1 | 9/2014 | Matsuda et al. | |
| 2014/0341613 A1 | 11/2014 | Ishida et al. | |

FOREIGN PATENT DOCUMENTS

| | | |
|---|---|---|
| JP | H11-184279 A | 7/1999 |
| JP | H11-257459 A | 9/1999 |
| JP | H11-311302 A | 11/1999 |
| JP | 2002243003 A * | 8/2002 |
| JP | 2005-054861 A | 3/2005 |
| JP | 2010-083658 A | 4/2010 |
| JP | 2013-57369 A | 3/2013 |
| JP | 2014-039450 A | 2/2014 |
| JP | 2014-111983 A | 6/2014 |

OTHER PUBLICATIONS

Schwamb and Merrill, Elements of Mechanism, 2d. Ed., p. 47 (J. Wiley and Sons 1910).

* cited by examiner

DRIVE TRANSMITTER AND IMAGE FORMING APPARATUS INCORPORATING THE DRIVE TRANSMITTER

CROSS-REFERENCE TO RELATED APPLICATIONS

This patent application is a continuation of U.S. patent application Ser. No. 14/736,091, filed Jun. 10, 2015, which is based on and claims priority pursuant to 35 U.S.C. § 119(a) to Japanese Patent Application Nos. 2014-128391, filed on Jun. 23, 2014, and 2015-023306, filed on Feb. 9, 2015, in the Japan Patent Office, the entire disclosure of each of which is hereby incorporated by reference herein.

BACKGROUND

Technical Field

This disclosure relates to a drive transmitter and an image forming apparatus that includes the drive transmitter.

Related Art

Drive devices are used for image formation performed in an image forming apparatus such as a copier, printer, facsimile machine, and multifunction peripherals including at least two functions of the copier, printer, and facsimile machine. Specifically, drive devices are used to drive a photoconductor and a transfer belt.

As an example, a drive device includes a first drive transmitting part to transmit a driving force generated by a drive motor to a first rotary body and a second drive transmitting part to transmit the driving force generated by the drive motor to a second rotary body. The first drive transmitting part includes a drive belt that is wound around a driving pulley and a driven pulley while being held taut. The second drive transmitting part includes multiple externally toothed gears.

SUMMARY

At least one aspect of this disclosure provides a drive transmitter including a group of gears, multiple pulleys, and a drive belt. Grease is applied to the group of gears. At least one gear of the group of gears is an internally toothed gear. The drive belt is wound around the multiple pulleys to drive the group of gears.

Further, at least one aspect of this disclosure provides an image forming apparatus including the drive transmitter.

DETAILED DESCRIPTION

Figure 1:
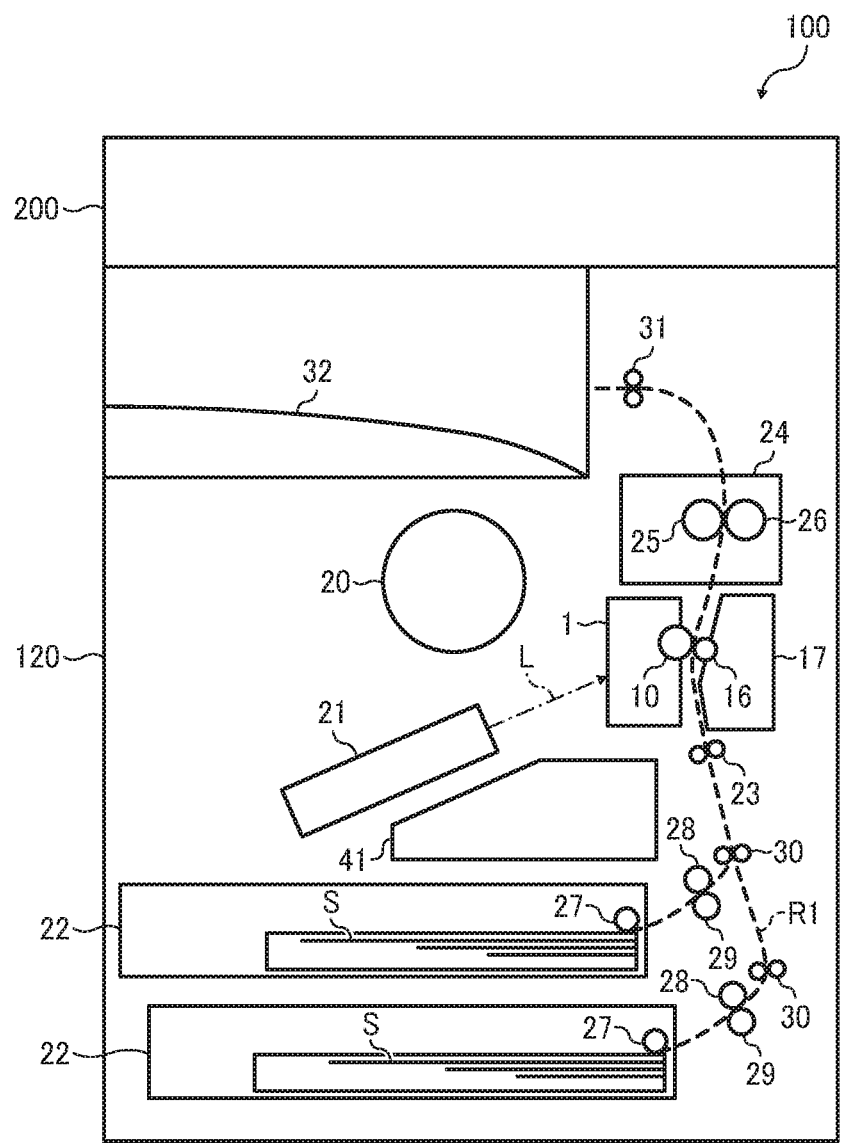
FIG. 1 is a diagram illustrating a schematic configuration of an image forming apparatus according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Figure 2A:
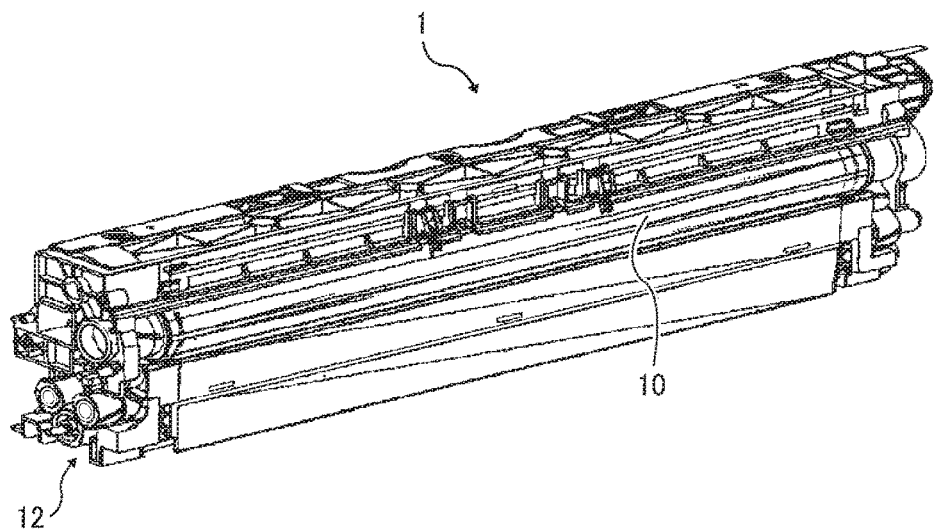
FIG. 2A is a perspective view illustrating a process cartridge included in the image forming apparatus of FIG. 1.
Figure 2B:
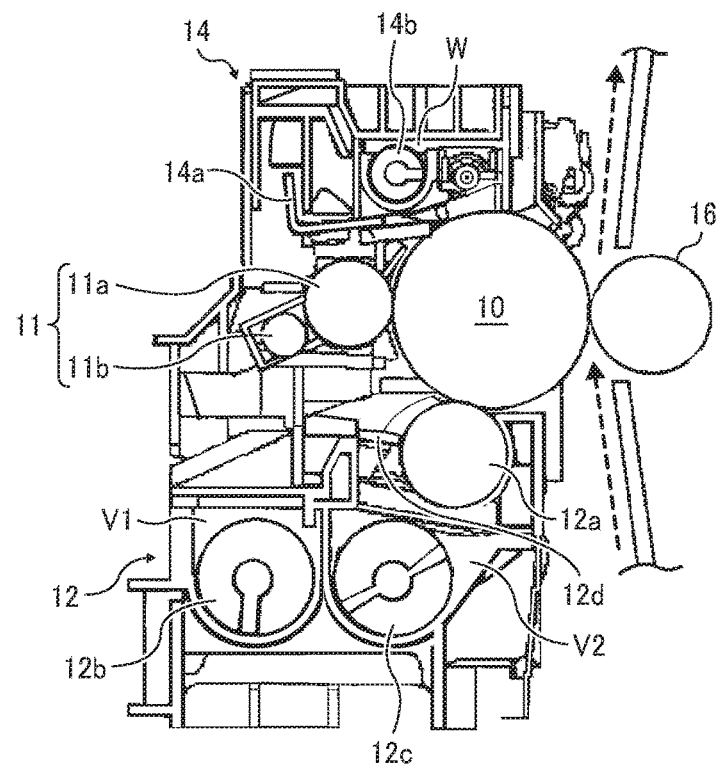
FIG. 2B is a cross sectional view illustrating the process cartridge of FIG. 2A.

Now, a description is given of an image forming apparatus 100 according to an example of this disclosure with reference to FIGS. 1, 2A, and 2B.

FIG. 1 is a diagram illustrating a schematic configuration of the image forming apparatus 100 according to an example of this disclosure. FIG. 2A is a perspective view illustrating a process cartridge 1 included in the image forming apparatus 100 of FIG. 1. FIG. 2B is a cross sectional view illustrating the process cartridge 1 of FIG. 2A.

The image forming apparatus 100 includes an image reading device 200 disposed on top of an apparatus body 120 of the image forming apparatus 100.

The apparatus body 120 of the image forming apparatus 100 includes the process cartridge 1, as illustrated in FIG. 1.

As illustrated in FIG. 2B, the process cartridge 1 includes a photoconductor 10, a charger 11, a developing device 12, and a cleaning device 14.

The photoconductor 10 functions as an image bearer. The charger 11, the developing device 12, and the cleaning device 14 are disposed around the photoconductor 10 to function as image processing units for forming an image on the photoconductor 10.

The process cartridge 1 is detachably attachable to the apparatus body 120. Since the photoconductor 10, the charger 11, the developing device 12, and the cleaning device 14 are provided together in the process cartridge 1 as a unit, replacement of the process cartridge 1 and maintenance of the image forming apparatus 100 can be performed easily. In addition, respective positions of the units and components in the image forming apparatus 100, and therefore quality of image formed in the image forming apparatus 100 can be enhanced.

The charger 11 includes a charging roller 11a and a removing roller 11b. The charging roller 11a uniformly charges a surface of the photoconductor 10. The removing roller 11b removes foreign material such as toner attached to the surface of the charging roller 11a.

The developing device 12 includes a first powder chamber V1 and a second powder chamber V2. The first powder chamber V1 is provided with a first conveying screw 12b that functions as a developer conveyor. The second powder chamber V2 is provided with a second conveying screw 12c that functions as a developer conveyor, a developing roller 12a that functions as a developer bearer, and a doctor blade 12d that functions as a developer regulator.

Both the first powder chamber V1 and the second powder chamber V2 contain developer, specifically, two-component developer that includes magnetic carriers and negatively charged toner. The first conveying screw 12b is rotated by a drive unit to convey the developer contained in the first powder chamber V1 toward a near side in FIG. 2B. The developer conveyed by the first conveying screw 12b to an end of the near side of the first powder chamber V1 in FIG. 2B enters in the second powder chamber V2.

The second conveying screw 12c of the second powder chamber V2 is rotated by a drive unit to convey the developer entered into the second powder chamber V2 toward a far side in the FIG. 2B. Above the second conveying screw 12c that conveys the developer as described above, the developing roller 12a is disposed in a parallel position with respect to the second conveying screw 12c. The developing roller 12a includes a magnet roller fixed inside a developing sleeve that is a rotary non-magnetic sleeve.

Part of the developer conveyed by the second conveying screw 12c is taken up to a surface of the developing roller 12a due to a magnetic force exerted by a magnet roller located inside the developing roller 12a. The doctor blade 12d is disposed facing the developing roller 12a with a given gap with the surface of the developing roller 12a and regulates a thickness of layer of the developer attached onto the surface of the developing roller 12a. After the doctor blade 12d regulates the layer thickness of the developer on the developing roller 12a, the developer on the developing roller 12a is conveyed to a developing region located at a position facing the photoconductor 10. In the developing region, toner of the developer is attached to an electrostatic latent image formed on the surface of the photoconductor 10. Thus, a toner image is formed on the photoconductor 10.

After consuming the toner due to the above-described development of the toner image, the developer is returned to the second conveying screw 12c along with movement of the surface of the developing roller 12a. The second conveying screw 12c conveys the toner-consumed developer to the end of the second powder chamber V2, so that the developer goes back to the first powder chamber V1. Accordingly, the developer circulates in the developing device 12.

The developing device 12 includes a toner concentration sensor that detects concentration of toner in the developer contained in the first powder chamber V1. The toner concentration sensor measures the concentration of toner in the developer based on magnetic permeability of the developer. As the concentration of toner decreases, the concentration of magnetic carriers in the developer increases, and therefore the magnetic permeability becomes higher.

When a value measured and obtained by the toner concentration sensor exceeds a target value, i.e., a threshold value, the toner is supplied from the toner bottle 20 to control the toner concentration to a constant value. The target value is determined based on a detection result obtained by an optical sensor that detects an amount of attachment of toner to a toner pattern formed on the photoconductor 10.

With the above-described operations, a reference pattern density on the photoconductor 10 is controlled to a constant value. However, when the toner bottle 20 is out of toner, a reduction in toner concentration cannot be prevented. In such a situation, even after the toner bottle 20 performs toner supply for a given time period, the detection result of the toner pattern obtained by the optical sensor is not corrected. Therefore, in a case in which the detection result of the toner pattern obtained by the optical sensor does not get better even after the toner bottle 20 supplies toner, a determination unit or a controller determines or estimates an end of toner in the toner bottle 20.

After the end of toner is determined by the determination unit or the controller, the toner bottle 20 is replaced to a new toner bottle 20. In an end-of-toner recovery performance, fresh toner in the new toner bottle 20 is supplied to the developing device 12 in the following procedures.

In order to mix the toner and the developer well, the developing roller 12a, the first conveying screw 12b, and the second conveying screw 12c are rotated. At the same time, in order to prevent nonuniformity of developer sliding on the developing roller 12a, the photoconductor 10 is also driven to rotate.

The cleaning device 14 that functions as a cleaner includes a cleaning blade 14a and a toner collecting coil 14b. The cleaning blade 14a contacts the surface of the photoconductor 10 and scrapes residual toner remaining on the surface of the photoconductor 10. The toner collecting coil 14b is contained in a collecting part W to convey collected toner that is collected by the cleaning blade 14a. The collected toner conveyed by the toner collecting coil 14b is conveyed by a toner conveying device to either the developing device 12 or a waste toner bottle 41.

The image forming apparatus 100 further includes a transfer device 17, a thermal fixing device 24, a laser writing device 21, and multiple sheet trays 22 in the apparatus body 120, as illustrated in FIG. 1.

The transfer device 17 includes a transfer roller 16 that is pressed against the surface of the photoconductor 10.

The thermal fixing device 24 that functions as a fixing device is disposed above the transfer device 17. The thermal fixing device 24 includes a heat roller 25 and a pressure roller 26.

The laser writing device 21 that functions as a latent image forming device includes a laser light source, a polygon mirror for scanning, a polygon motor, and a f-theta (fθ) lens.

Each of the multiple sheet trays 22 disposed vertically in steps accommodates a sheet S such as a transfer sheet and an overhead projector (OHP) sheet.

To generate a copy using the above-described image forming apparatus 100, a user or an operator presses a start switch provided on the image forming apparatus 100. As the start switch is pressed, the image reading device 200 of the image forming apparatus 100 scans image data of an original document placed thereon. At the same time, a photoconductor drive motor provided to the image forming apparatus 100 rotates the photoconductor 10, so that the charger 11 including the charging roller 11a uniformly charges the surface of the photoconductor 10. Then, the laser writing device 21 emits laser light based on the image data scanned by the image reading device 200 to irradiate the surface of the photoconductor 10 for forming an electrostatic latent image. Thereafter, the developing device 12 supplies toner to the electrostatic latent image, so as to develop the electrostatic latent image with the toner attached into a visible toner image.

At the same time the user presses the start switch, a pickup roller 27 picks up and feeds the sheet S from a selected one of the multiple sheet trays 22. A sheet feed roller 28 and a sheet separation roller 29 separate the sheet S one by one and convey the separated sheet S to a sheet feed path R1.

The sheet S fed to the sheet feed path R1 is conveyed by a sheet conveying roller 30. While traveling in the sheet feed path R1, the sheet S abuts against a registration roller pair 23 to stop. In synchronization with movement of the toner image formed on the surface of the photoconductor 10, the sheet S is conveyed to a transfer nip region that is formed between the transfer roller 16 and the photoconductor 10 in contact with each other.

The sheet S conveyed to the transfer nip region receives the toner image from the photoconductor 10 by the transfer device 17.

After transfer of the toner image to the sheet S, residual toner and residual electric potential remain on the surface of the photoconductor 10. The residual toner is removed by the cleaning device 14 and the residual electric potential is removed by an electric discharging device. Thus, the photoconductor 10 becomes ready for a subsequent image forming operation that starts from electric charges by the charger 11.

By contrast, the sheet S having the toner image thereon is conveyed to the thermal fixing device 24. In the thermal fixing device 24, the sheet S passes between the heat roller 25 and the pressure roller 26 to fix the toner image to the sheet S by application of heat and pressure while being conveyed by the heat roller 25 and the pressure roller 26. After the toner image is fixed to the sheet S, a sheet discharging roller pair 31 conveys the sheet S to a discharged sheet stacker 32 to be stacked thereon.

Figure 3:
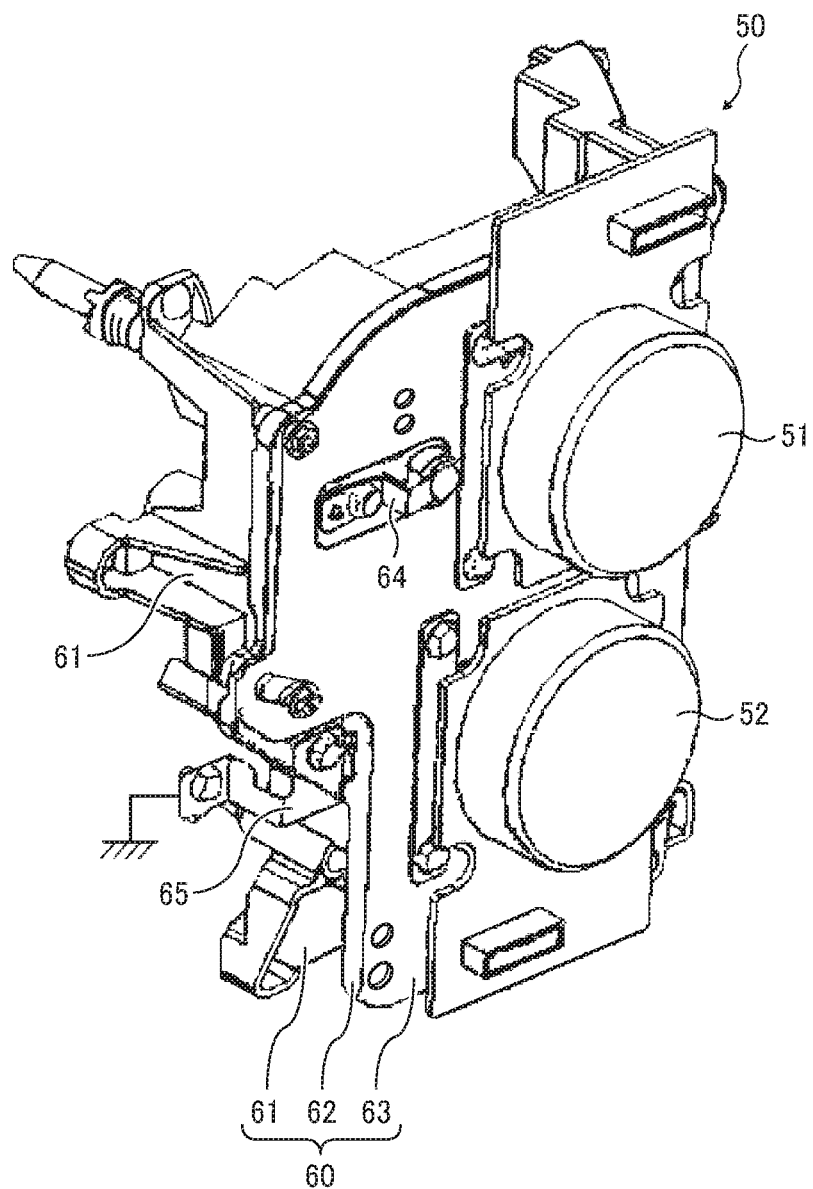
FIG. 3 is a perspective view illustrating a drive device included in the image forming apparatus of FIG. 1.
Figure 4:
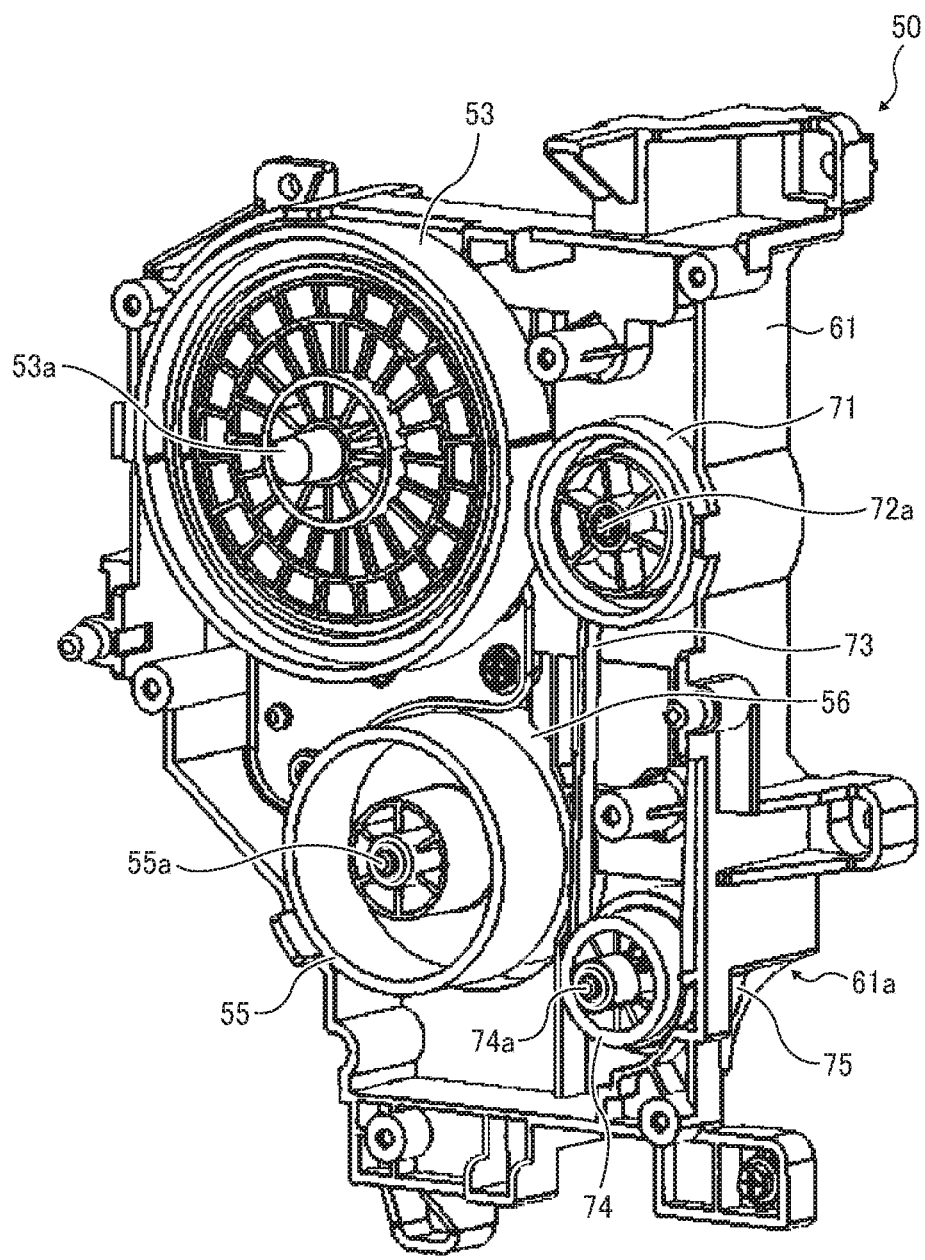
FIG. 4 is a perspective view illustrating an inside of the drive device of FIG. 3.
Figure 5:
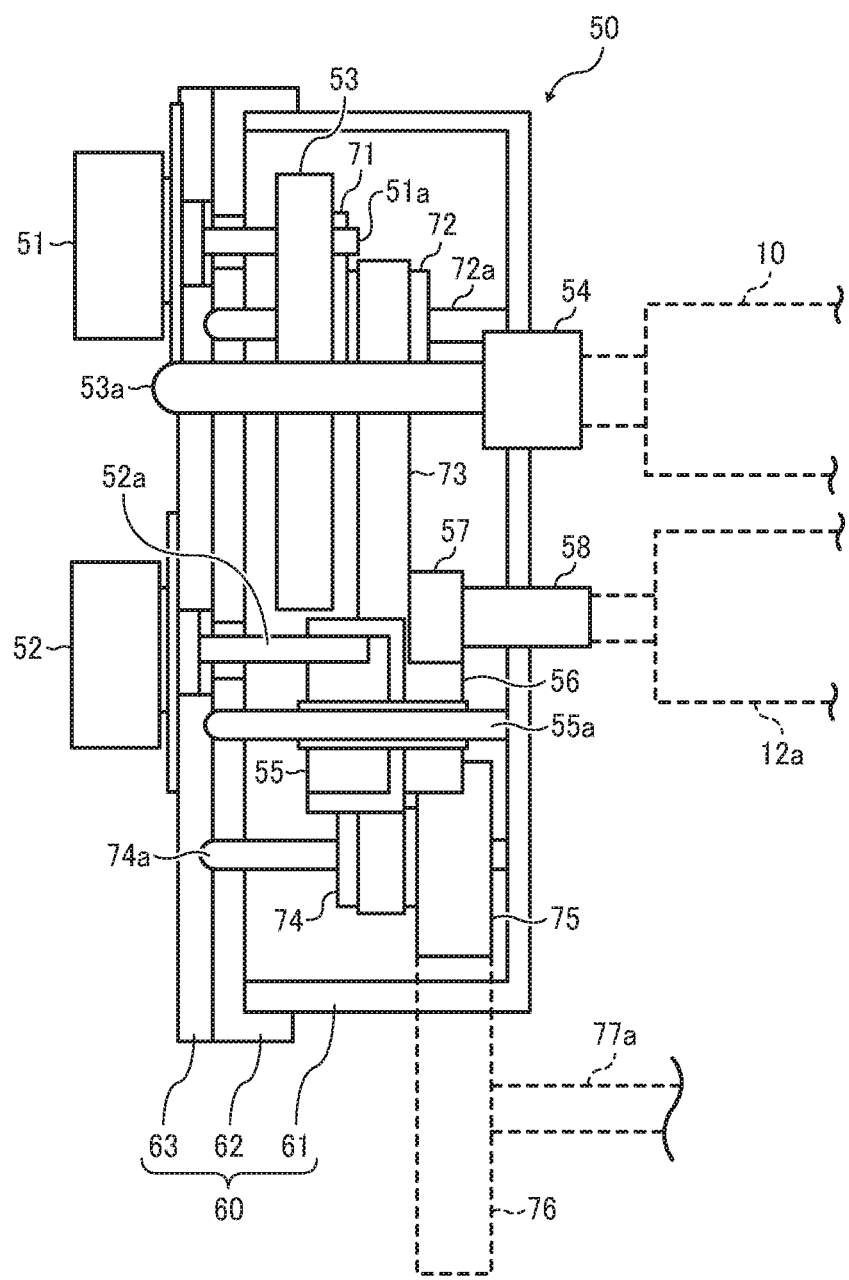
FIG. 5 is a cross sectional view illustrating the drive device of FIG. 3.

Next, a description is given of details of the image forming apparatus 100 according to an example of this disclosure with reference to FIGS. 3, 4, and 5.

FIG. 3 is a perspective view illustrating a drive device 50 included in the image forming apparatus 100 of FIG. 1. FIG. 4 is a perspective view illustrating an inside of the drive device 50 of FIG. 3. FIG. 5 is a cross sectional view illustrating a schematic configuration of the drive device 50 of FIG. 3.

The drive device 50 drives the photoconductor 10 and the developing roller 12a. The drive device 50 includes a holder 60 to retain drive transmitting members such as a photoconductor drive motor 51, a developing motor 52, and gears to transmit respective driving forces of the photoconductor drive motor 51 and the developing motor 52, both of which functioning as a drive source.

The holder 60 includes a resin housing 61, a bracket 62, and a vibration control panel 63. The bracket 62 is a metallic bracket that functions as a first holding member. The vibration control panel 63 is a metallic panel that functions as a second holding member.

As illustrated in FIGS. 4 and 5, the resin housing 61 accommodates a group of gears including a photoconductor drive gear 53, a developing internally toothed gear 55, a developing driven gear 56, and a developing idler gear 57, each of which functioning as a drive transmitting member. The resin housing 61 further accommodates drive transmitting members that transmit a driving force to a waste toner conveying screw by which waste toner collected and fallen into the waste toner bottle 41 is conveyed to a far side of the waste toner bottle 41. Specifically, these drive transmitting members are a conveyance drive gear 71, a conveyance drive pulley 72, a conveyance timing belt 73, a conveyance driven pulley 74, and a conveyance idler gear 75.

The photoconductor drive gear 53 is fixed to a photoconductor drive shaft 53a that is formed by metal and is rotatably supported by the holder 60 and is meshed with a motor gear 51a of the photoconductor drive motor 51. One end of the photoconductor drive shaft 53a passes through the bracket 62 and the vibration control panel 63 and is rotatably supported to the bracket 62. The other end of the photoconductor drive shaft 53*a* is attached by a photoconductor drive side coupling 54 and is rotatably supported to the resin housing 61. The photoconductor drive side coupling 54 is linked to a photoconductor driven side coupling that is fixed to one end of a rotary shaft of the photoconductor 10.

The developing internally toothed gear 55 is rotatably supported by a developing drive pin 55*a* and is meshed with a motor gear 52*a* of the developing motor 52. The motor gear 52*a* functions as an externally toothed gear. The developing drive pin 55*a* that functions as a support shaft is formed by metal and is fixed to the resin housing 61. The developing internally toothed gear 55 and the developing driven gear 56 that is disposed coaxially with the developing internally toothed gear 55 are made as a resin integrated molding. The developing driven gear 56 is meshed with the developing idler gear 57. A tip of the developing drive pin 55*a* is fitted and positioned to the bracket 62.

A developing drive side coupling 58 is mounted on an axial center of the developing idler gear 57. The developing drive side coupling 58 passes through the resin housing 61 and is rotatably supported by the resin housing 61. The developing drive side coupling 58 is linked to a developing driven side coupling that is fixed to an end of a rotary shaft of the developing roller 12*a*. The developing idler gear 57 and the developing drive side coupling 58 are made as a resin integrated molding.

Further, the motor gear 51*a* of the photoconductor drive motor 51 is meshed with the conveyance drive gear 71. The conveyance drive pulley 72 is made with the conveyance drive gear 71 as a resin integrated molding and the conveyance driven pulley 74 is made with the conveyance idler gear 75 as a resin integrated molding. The conveyance timing belt 73 is wound around the conveyance drive pulley 72 and the conveyance driven pulley 74.

Instead of the conveyance timing belt 73, a conveyance V-belt may be employed to transmit a driving force via respective frictional forces of the conveyance drive pulley 72 and the conveyance driven pulley 74.

One end of the resin integrated molding that includes the conveyance drive gear 71 and the conveyance drive pulley 72 is rotatably supported by a conveyance drive pin 72*a* that is formed by metal and is fixed to the resin housing 61. A tip of the conveyance drive pin 72*a* is fitted and positioned to the bracket 62.

The resin integrated molding that includes the conveyance idler gear 75 and the conveyance driven pulley 74 is rotatably supported by a conveyance driven pin 74*a* that is formed by metal and is fixed to the resin housing 61. A tip of the conveyance driven pin 74*a* is fitted and positioned to the bracket 62.

As illustrated in FIG. 4, part of the conveyance idler gear 75 is exposed from a side opening 61*a* of the resin housing 61. A screw drive gear 76 is fixed to one end of a screw shaft 77*a* of the waste toner conveying screw. As illustrated in FIG. 5, the screw drive gear 76 is meshed with the conveying idler gear 75 through the side opening 61*a*.

As illustrated in FIG. 3, one end of a ground plate 65 that is grounded is screwed to the bracket 62 with a screw 83. Further, one end of the photoconductor drive shaft 53*a* that is passed through the bracket 62 is fixed to one end of a grounding electrode 64. The other end of the grounding electrode 64 is screwed to the bracket 62 with a screw 82. Accordingly, the photoconductor 10 is grounded via the photoconductor drive shaft 53*a*, the grounding electrode 64, the bracket 62, and the ground plate 65.

A description is given of a detailed configuration of the drive device 50 according to an example of this disclosure, with reference to FIGS. 6 through 13.

Figure 6:
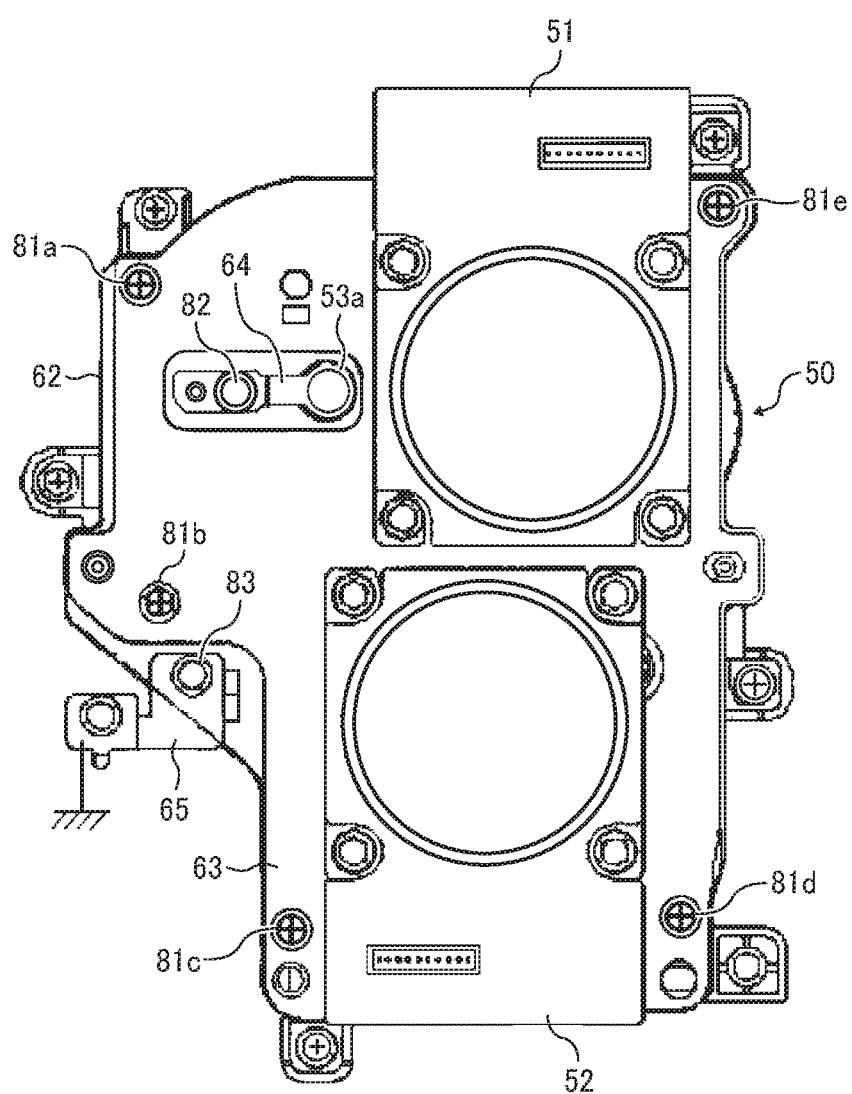
FIG. 6 is a front view illustrating of the drive device on a motor side.

FIG. 6 is a front view illustrating of the drive device 50 on a motor side.

As illustrated in FIG. 6, the vibration control panel 63 and the bracket 62 are disposed overlapping each other. Five (5) edge portions of the vibration control panel 63 are fixed to the resin housing 61 by respective screws 81*a* through 81*e* via the bracket 62. Consequently, the bracket 62 and the vibration control panel 63 are partly bonded to each other with the screws 81*a* through 81*e* at the five edge portions of the vibration control panel 63. In addition, the photoconductor drive motor 51 and the developing motor 52 are screwed to the bracket 62 via the vibration control panel 63.

The holder 60 of the drive device 50 includes multiple vibration members, for example, multiple drive transmitting members such as the photoconductor drive gear 53 and the developing internally toothed gear 55, the photoconductor drive motor 51, and the developing motor 52. It is likely that vibration caused by the multiple vibration members generates noise. Vibration caused by the photoconductor drive motor 51 and the developing motor 52 is transmitted to the vibration control panel 63 that contacts the photoconductor drive motor 51 and the developing motor 52, and therefore the vibration control panel 63 vibrates. By contrast, vibration caused by the multiple drive transmitting members such as the photoconductor drive gear 53 and the developing internally toothed gear 55 is transmitted to the bracket 62 via the photoconductor drive shaft 53*a*, the developing drive pin 55*a*, the conveyance drive pin 72*a*, and the conveyance driven pin 74*a*. As a result, this transmission of vibration vibrates the bracket 62.

As previously described, the bracket 62 and the vibration control panel 63 are disposed overlapping each other and partly bonded to each other with the screws 81*a* through 81*e* at the five edge portions of the vibration control panel 63, as illustrated in FIG. 6. Therefore, the vibration control panel 63 and the bracket 62 do not vibrate together but vibrate individually. Specifically, the vibration control panel 63 vibrates due to vibration caused by the photoconductor drive motor 51 and the developing motor 52 and the bracket 62 vibrates due to vibration caused by the multiple transmission members such as gears contained in the resin housing 61. The vibrations of the vibration control panel 63 and the bracket 62 interfere with each other at the five edge portions where the vibration control panel 63 and the bracket 62 are screwed with the screws 81*a* through 81*e* at the five edge portions of the vibration control panel 63. At this time, respective rigidities and bonding portions of the vibration control panel 63 and the bracket 62 are adjusted so as to generate a phase difference to cancel vibration of the vibration control panel 63 and vibration of the bracket 62 with each other at the bonding portions. By so doing, respective amounts of vibrations of the vibration control panel 63 and the bracket 62 are reduced.

By applying grease to the teeth of each gear of the holder 60, friction between respective teeth surfaces of the gears in the holder 60 is reduced. Consequently, application of grease to the gears in the holder 60 can preferably prevent vibrations of the bracket 62 and the vibration control panel 63, enhance rotation accuracy, and prevent noise.

As illustrated in FIG. 4, the gear that meshes with the motor gear 52*a* of the developing motor 52 is disposed adjacent to or in the vicinity of the timing belt 73 that functions as a drive belt. In addition, as illustrated in FIG. 5, the gear that meshes the motor gear 52a of the developing motor 52 is disposed facing a surface of the conveyance timing belt 73.

An experimental validation of a comparative drive device was held under conditions that grease is applied to teeth of each externally toothed gear and that the externally toothed gears lubricated with grease are set to the drive device. As a result, by applying grease to the teeth of each externally toothed gears, rotation accuracy of the externally toothed gears is enhanced and noise caused by the rotation of the externally toothed gears is reduced.

However, in the experimental validation of the comparative drive device, when the comparative drive device is started, the grease lubricated to the teeth of the externally toothed gears is sprayed and scattered due to the centrifugal force generated by rotation of the externally toothed gears, so as to adhere to the drive belt. This inconvenience is likely to occur, for example, when an image forming apparatus is started after maintenance in which grease is applied to teeth of an externally toothed gear or when an externally toothed gear having teeth lubricated with grease is rotated in a driving test at factory shipping.

If grease adheres to a drive belt formed by rubber material, the drive belt deteriorates to likely bring the end of service life of the drive belt forward. Further, in a device in which drive transmission is performed by a frictional force generated between each pulley and the drive belt, if grease adheres to a back face of the drive belt (a face that contacts the pulleys), the frictional force between each pulley and the drive belt is decreased, and therefore it is not likely that the driving force is transmitted properly.

As described above with the comparative drive device, if the gear that meshes the motor gear 52a of the developing motor 52 is an externally toothed gear and grease is applied to the externally toothed gear, the grease applied to the externally toothed gear is sprayed around due to a centrifugal force exerted by rotation of the externally toothed gear and, as a result, the scattered grease adheres to the surface of the conveyance timing belt 73. Since the conveyance timing belt 73 is formed of rubber, if the greases is attached to the conveyance timing belt 73, the grease adhered areas on the surface of the conveyance timing belt 73 deteriorate and it is likely to shorten the service life of the conveyance timing belt 73.

Further, in a case in which a conveyance V-belt is employed as a drive belt that is stretched around the conveyance drive pulley 72 and the conveyance driven pulley 74 so as to transmit a driving force by a frictional force generated by the conveyance drive pulley 72 and the conveyance driven pulley 74, if the sprayed grease is attached to a rear surface of the conveyance V-belt, the frictional force between the conveyance V-belt and each of the conveyance drive pulley 72 and the conveyance driven pulley 74 decreases, and therefore stable transmission of a driving force cannot be performed.

As an alternative way to prevent spray of grease, a brush may be provided so as to apply grease to form a thin layer on each tooth of a gear. However, such grease application requires a great amount of work time, which increases the production cost.

To address this inconvenience, in the present example, the developing internally toothed gear 55 is employed to function as an internally toothed gear to mesh with the motor gear 52a of the developing motor 52. According to this configuration, even if the centrifugal force is applied to grease that is lubricated on the teeth of the developing internally toothed gear 55, the grease is not sprayed or scattered out. As a result, the configuration according to the present example can prevent a drive belt such as the conveyance timing belt 73 from attachment of sprayed grease. Further, an easy lubrication method such as point-type lubrication is employed to apply grease to an internally toothed gear such as the developing internally toothed gear 55, and therefore an increase in production cost can be prevented.

In this example, the developing internally toothed gear 55 is employed as a gear that meshes with the motor gear 52a of the developing motor 52. By so doing, a contact ratio with the motor gear 52a can be increased, and occurrence of rotation fluctuation, noise, and vibration can be prevented.

Further, the developing internally toothed gear 55 is a helical gear and a direction of the teeth thereof is set such that a direction of a thrust force exerted when driving the developing roller 12a is identical to a direction of the developing roller 12a. Specifically, the teeth of the helical gear are arranged at an angle to incline in a gear rotation direction thereof so that a side of the developing motor 52 is an upstream side and a side of the developing roller 12a is a downstream side in the gear rotation direction.

When the thrust force acts in a direction to the developing motor 52, it is likely that the thrust force generated by gear meshing of the motor gear 52a of the developing motor 52 and the developing internally toothed gear 55 moves the grease to an opening end face of the developing internally toothed gear 55. It is likely that the grease moved to the opening end face of the developing internally toothed gear 55 travels on an edge of the opening end face of the developing internally toothed gear 55 in a radial direction due to a centrifugal force, resulting in spraying or scattering of the grease.

By contrast, when the thrust force acts in a direction to the developing roller 12a, the thrust force generated by gear meshing of the motor gear 52a of the developing motor 52 and the developing internally toothed gear 55 conveys the grease to the developing roller 12a. Even if the grease moves toward the developing roller 12a, an axial end side of the developing internally toothed gear 55 on the side of the developing roller 12a is closed and is not open, as illustrated in FIG. 5. Therefore, this structure can prevent spray or scattering of the grease that is conveyed due to the thrust force exerted to the one axial end side of the developing internally toothed gear 55.

Figure 7:
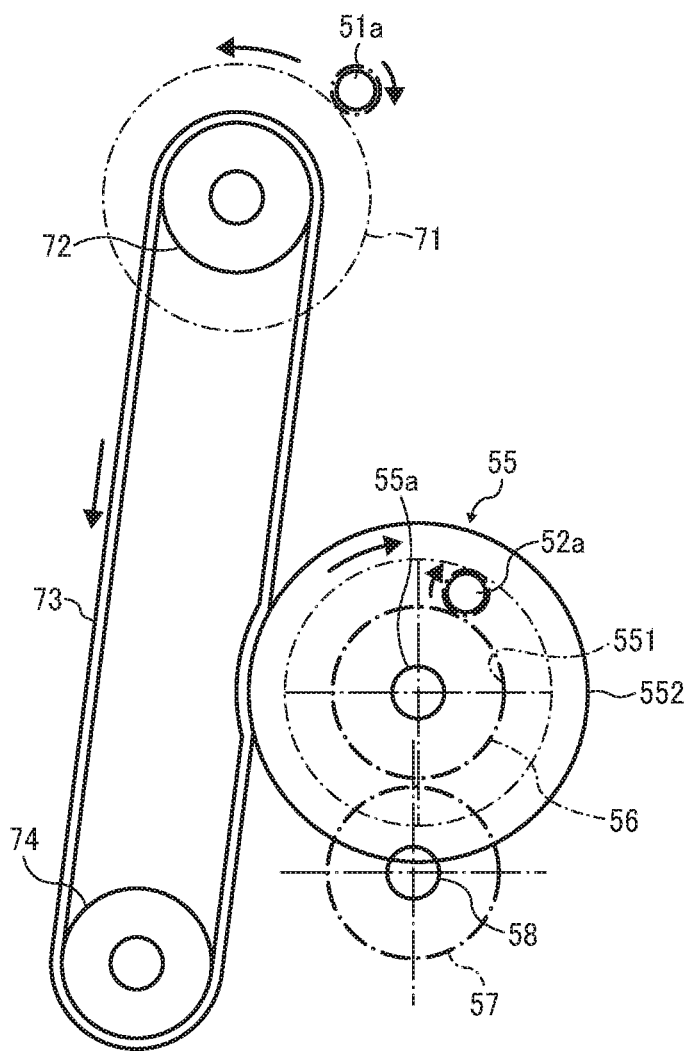
FIG. 7 is a diagram illustrating a configuration of the drive device according to another example of this disclosure.

Next, a description is given of another configuration of the drive device 50 according to another example of this disclosure with reference to FIG. 7.

FIG. 7 is a diagram illustrating the configuration of the drive device 50 according to another example of this disclosure.

As illustrated in FIG. 7, in the present example, an outer circumferential surface 552 of the developing internally toothed gear 55 is in contact with a first surface (a front surface) of the conveyance timing belt 73, so that the developing internally toothed gear 55 functions as a tightener to apply tension to the conveyance timing belt 73 or press and hold the conveyance timing belt 73 with taut. The developing internally toothed gear 55 includes internal teeth 551.

As previously described, the configuration of the present example employs the developing internally toothed gear 55 as a tightener. When compared with a different configuration in which another tightener is employed in addition to the developing internally toothed gear 55, the configuration of the present example can decrease the number of parts and components, and therefore can achieve a reduction in production cost of the image forming apparatus 100. Further, the developing internally toothed gear 55 applies tension to the conveyance timing belt 73, in other words, presses and holds the conveyance timing belt 73 with taut. By so doing, meshing of each pulley and the conveyance timing belt 73 is enhanced, and therefore preferable drive transmission can be performed.

Further, it is preferable that the developing internally toothed gear 55 contacts with a non-drive transmission area of two stretched areas on the conveyance timing belt 73. It is to be noted that a drive transmission area is a stretched area where the conveyance drive pulley 72 is located on an upstream side of the conveyance timing belt 73 in a belt surface moving direction and the conveyance driven pulley 74 is located on a downstream side of the conveyance timing belt 73 in the belt surface moving direction. It is preferable that the developing internally toothed gear 55 is located in contact with an opposite side of the drive transmission area, which is in contact with the non-drive transmission area. According to this configuration, even if the conveyance timing belt 73 becomes slack due to sliding between the developing internally toothed gear 55 and the conveyance timing belt 73, the rotation speed of the developing internally toothed gear 55 in contact with the non-transmission area is not or less affected when compared with a case in which the rotation speed of the developing internally toothed gear 55 is located in contact with the drive transmission area.

Further, it is preferable that a gear surface moving direction of the developing internally toothed gear 55 is identical to the belt surface moving direction of the conveyance timing belt 73 at a contact part where the developing internally toothed gear 55 and the conveyance timing belt 73 contact with each other. With this configuration, the sliding between the developing internally toothed gear 55 and the conveyance timing belt 73 can be prevented, and therefore the developing internally toothed gear 55 and the conveyance timing belt 73 are preferably rotated.

Further, abrasion of the conveyance timing belt 73 can be prevented. Specifically, a linear velocity of the developing internally toothed gear 55 is set to be identical to a linear velocity of the conveyance timing belt 73. By so doing, the developing internally toothed gear 55 and the conveyance timing belt 73 can be rotated preferably, and therefore abrasion of the conveyance timing belt 73 can be prevented.

Next, a description is given of a color image forming apparatus 500 including a color drive device according to an example of this disclosure.

Figure 8:
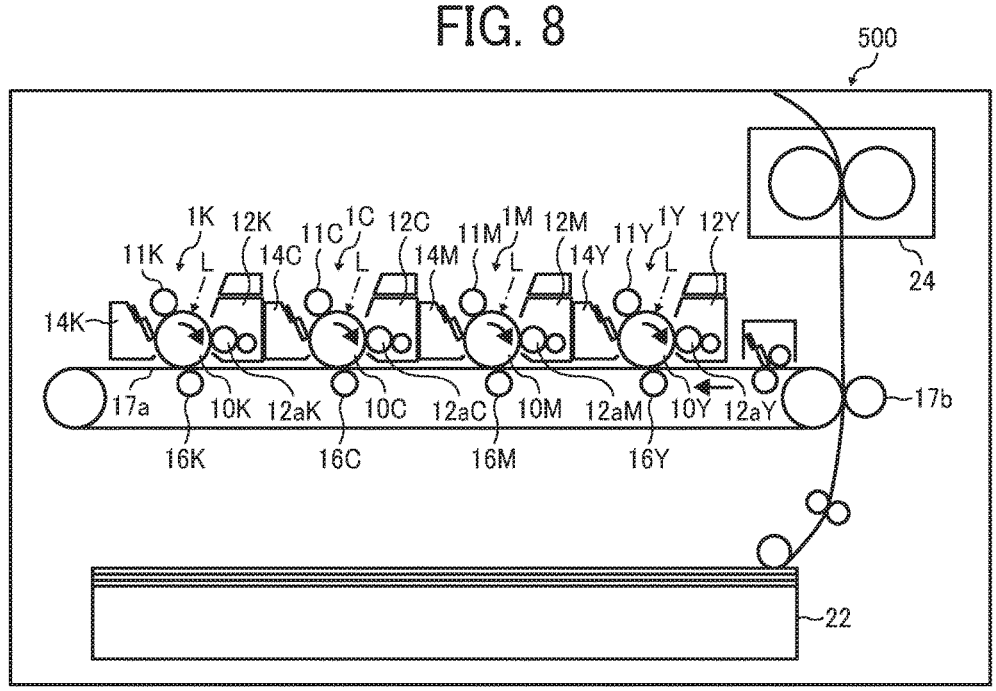
FIG. 8 is a diagram illustrating a color image forming apparatus according to an example of this disclosure.

FIG. 8 is a diagram illustrating the color image forming apparatus 500 according to an example of this disclosure.

As illustrated in FIG. 8, the color image forming apparatus 500 includes four process cartridges 1Y, 1M, 1C, and 1K to form yellow, magenta, cyan, and black toner images, respectively. The process cartridges 1Y, 1M, 1C, and 1K are disposed in a horizontal direction along an intermediate transfer belt 17a at given intervals.

It is to be noted that suffixes "Y", "M", "C", and "K" represent respective colors of yellow, magenta, cyan, and black toners. Since the process cartridges 1Y, 1M, 1C, and 1K are basically identical in structure and functions except for the toner colors, it is also referred to as a "process cartridge 1" without suffix.

It is also to be noted that the process cartridges 1Y, 1M, 1C, and 1K have the same structure as the process cartridge 1 illustrated in FIG. 2B. Specifically, similar to the process cartridge 1 of the image forming apparatus 100 illustrated in FIGS. 1, 2A, and 2B, the process cartridges 1Y, 1M, 1C, and 1K of the color image forming apparatus 500 illustrated in FIG. 8 include photoconductors 10Y, 10M, 10C, and 10K (which are similar to the photoconductor 10 in FIGS. 1, 2A, and 2B), chargers 11Y, 11M, 11C, and 11K (which are similar to the charger 11 in FIGS. 1 and 2B), developing devices 12Y, 12M, 12C, and 12K (which are similar to the developing device 12 in FIGS. 1, 2A, and 2B), and cleaning devices 14Y, 14M, 14C, and 14K (which are similar to the cleaning device 14 in FIGS. 1 and 2B). The developing devices 12Y, 12M, 12C, and 12K include drive developing rollers 12aY, 12aM, 12aC, and 12aK.

Similar to image formation performed in the image forming apparatus 100 of FIG. 1, the color image forming apparatus 500 of FIG. 8 includes a laser writing device to emit laser light L so as to form respective electrostatic latent images on the photoconductors 10Y, 10M, 10C, and 10K and develops the respective electrostatic latent images into respective visible toner images by the developing devices 12Y, 12M, 12C, and 12K.

The color image forming apparatus 500 further includes primary transfer rollers 16Y, 16M, 16C, and 16K and a secondary transfer roller 17b. The primary transfer rollers 16Y, 16M, 16C, and 16K primarily transfer the respective toner images formed on the photoconductors 10Y, 10M, 10C, and 10K by sequentially overlaying the respective toner images onto a surface of the intermediate transfer belt 17a so as to form a color toner image. The secondary transfer roller 17b secondarily transfers the color toner image held on the intermediate transfer belt 17a onto the sheet S that is fed from a selected one of the sheet trays 22. Then, the color toner image is fixed to the sheet S in the thermal fixing device 24 and is discharged to a sheet ejection tray such as the discharged sheet stacker 32 in FIG. 1.

Figure 9:
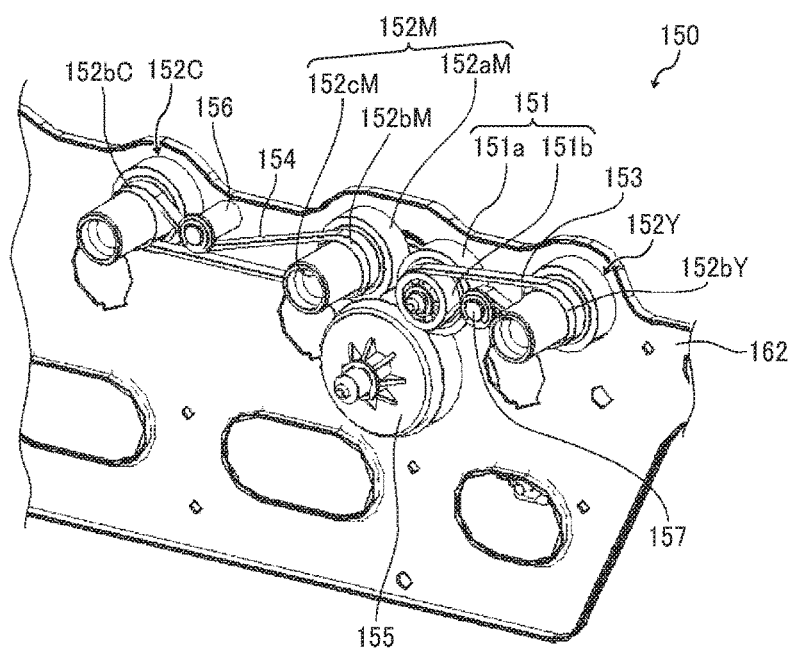
FIG. 9 is a perspective view illustrating a color developing drive device according to an example of this disclosure.
Figure 10:
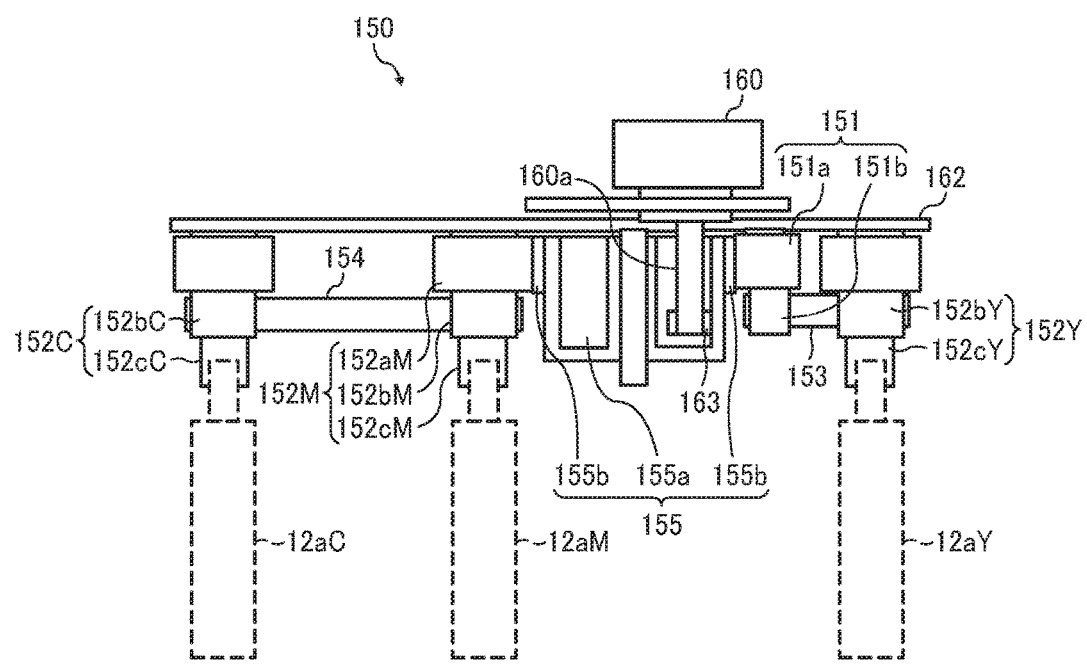
FIG. 10 is a cross sectional view illustrating the color developing drive device of FIG. 9.

FIG. 9 is a perspective view illustrating a color developing drive device 150 to the drive developing rollers 12aY, 12aM, and 12aC according to an example of this disclosure. FIG. 10 is a cross sectional view illustrating the color developing drive device 150 of FIG. 9.

The color developing drive device 150 includes a color developing motor 160 and a bracket 162. The bracket 162 is formed of metal to hold drive transmitting members such as gears to transmit torque or a driving force generated by the color developing motor 160. The color developing motor 160 includes a motor shaft 160a and is attached to the bracket 162. Specifically, the color developing motor 160 is attached to one surface of the bracket 162 that is opposite to the other surface or an opposite surface of the bracket 162 facing the drive developing rollers 12aY, 12aM, and 12aC so that the motor shaft 160a passes through the bracket 162. On the opposite surface of the bracket 162, a developing internally and externally toothed gear 155, an idler 151, drive output members 152Y, 152M, and 152C, a first tightener 157, and a second tightener 156 are disposed to be supported by the bracket 162.

The drive output members 152Y, 152M, and 152C have identical shapes and elements to each other. Each of the drive output members 152Y, 152M, and 152C includes a driven gear 152a (i.e., driven gears 152aY, 152aM, and 152aC), a pulley 152b (i.e., pulleys 152bY, 152bM, and 152bC), and a drive-side coupling 152c (i.e., drive-side couplings 152cY, 152cM, and 152cC). The idler 151 includes an idler gear 151a and a pulley 151b. The developing internally and externally toothed gear 155, the idler 151, and the drive output members 152Y, 152M, and 152C are rotatably supported by respective driving pins fixed to the bracket 162. Accordingly, by forming the drive output members 152Y, 152M, and 152C to have identical shapes and elements to each other, standardization of the parts can be promoted, and therefore a reduction in part management cost can be achieved.

It is to be noted that the drive output members 152Y and 152C can do with or without the driven gears 152aY and 152aC. In other words, the drive output members 152Y and 152C can also include the pulleys 152bY and 152bC and the drive-side couplings 152cY and 152cC alone.

A first belt 153 is wound around the pulley 151b of the idler 151 and the pulley 152bY of the drive output member 152Y. The first tightener 157 is disposed in contact with an outer circumferential surface of the first belt 153 to hold the first belt 153 with taut.

A second belt 154 is wound around the pulley 152bM of the drive output member 152M and the pulley 152bC of the drive output member 152C. The second tightener 156 is disposed in contact with an outer circumferential surface of the second belt 154 to hold the second belt 154 with taut.

The first belt 153 and the second belt 154 may be a timing belt, a V-belt, and the like.

The developing internally and externally toothed gear 155 includes an internal tooth part 155a and an external tooth part 155b. The internal tooth part 155a of the developing internally and externally toothed gear 155 is meshed with a motor gear 163 of the color developing motor 160. The external tooth part 155b of the developing internally and externally toothed gear 155 is meshed with the idler gear 151a of the idler 151 and the driven gear 152aM of the drive output member 152M.

For rotating the drive developing roller 12aY, a driving force generated by the color developing motor 160 is transmitted to the drive developing roller 12aY via the developing internally and externally toothed gear 155, the idler 151, the first belt 153, and the drive output member 152Y. For rotating the drive developing roller 12aM, a driving force generated by the color developing motor 160 is transmitted to the drive developing roller 12aM via the developing internally and externally toothed gear 155 and the drive output member 152M. For rotating the drive developing roller 12aC, a driving force generated by the color developing motor 160 is transmitted to the drive developing roller 12aC via the developing internally and externally toothed gear 155, the drive output member 152M, the second belt 154, and the drive output member 152C.

Similar to the drive device 50, the color developing drive device 150 employs the developing internally and externally toothed gear 155 as a gear that meshes with the motor gear 163 of the color developing motor 160. According to this structure, even if the centrifugal force acts on the grease that is lubricated to the internal tooth part 155a of the developing internally and externally toothed gear 155, the grease is not sprayed or scattered out. As a result, a drive belt such as the first belt 153 and the second belt 154 is prevented from adhesion of sprayed grease. Further, an easy lubrication method such as point-type lubrication can also be employed to apply grease to an internally toothed gear such as the internal tooth part 155a of the developing internally and externally toothed gear 155, and therefore an increase in production cost can be prevented.

Further, by employing the internal tooth part 155a of the developing internally and externally toothed gear 155 as a gear that meshes with the motor gear 163 of the color developing motor 160, a contact ratio with the motor gear 163 can be increased, and occurrence of rotation fluctuation, noise, and vibration can be prevented.

Further, the internal tooth part 155a of the developing internally and externally toothed gear 155 is a helical gear and a direction of the teeth thereof is set such that a direction of a thrust force exerted when driving the developing roller 12a is identical to a direction of the developing roller 12a. Specifically, the teeth of the helical gear are arranged at an angle to incline in a gear rotation direction thereof so that a side of the color developing motor 160 is an upstream side and a side of the developing roller 12a is a downstream side in the gear rotation direction. Accordingly, a thrust force generated by gear meshing of the motor gear 163 of the color developing motor 160 and the internal tooth part 155a of the developing internally and externally toothed gear 155 moves grease to the developing roller 12a. Even if the grease moves toward the developing roller 12a, an axial end side of the developing internally and externally toothed gear 155 on the side of the developing roller 12a is closed and is not open to the side of the developing roller 12a, as illustrated in FIG. 5. Therefore, this structure can prevent spray or scattering of the grease that is conveyed due to the thrust force exerted to the axial end side of the developing internally and externally toothed gear 155.

The configurations according to the above-described embodiment are examples. The present invention can achieve the following aspects effectively.

Aspect 1.

In Aspect 1, a drive transmitter (for example, the drive device 50 and the color developing drive device 150) includes a group of gears (in other words, one or more gears, for example, the photoconductor drive gear 53, the developing internally toothed gear 55, the developing driven gear 56, and the developing idler gear 57), multiple pulleys (for example, the conveyance drive pulley 72 and the conveyance driven pulley 74), and a drive belt (for example, the conveyance timing belt 73). Grease is applied to the group of gears. The drive belt is wound around the multiple pulleys to drive the group of gears. At least one gear of the group of gears to which the grease is applied is an internally toothed gear (for example, the developing internally toothed gear 55).

According to Aspect 1, even if the centrifugal force is applied to grease that is lubricated on the teeth of the internally toothed gear when the internally toothed gear is rotated, the grease is not sprayed or scattered out. As a result, scattering of grease from the internally toothed gear can be prevented, and therefore attachment of sprayed grease to the drive belt can be prevented. Accordingly, deterioration of the drive belt due to attachment of grease can be restrained.

In the drive transmitter to perform transmission by friction generated by each pulley and the drive belt, attachment of grease onto the rear surface of the drive belt can be prevented, and therefore a decrease in friction force of each pulley and the drive belt can be reduced or restrained. Accordingly, proper transmission can be performed.

Further, by applying grease to the teeth of the gears, friction generated between respective teeth surfaces of the gears is reduced. Accordingly, vibrations of the gears and other parts in the drive transmitter can be prevented and rotation accuracy of the gears can be enhanced. In addition, noise generated due to frictions between the respective teeth surfaces of the gears can be prevented.

Aspect 2.

In Aspect 1, the internally toothed gear is disposed facing a surface of the drive belt such as the conveyance timing belt 73.

Accordingly, as described in the examples above, if grease that is applied to a gear disposed facing the surface of the drive belt such as the conveyance timing belt 73 is sprayed or scattered around due to a centrifugal force exerted by rotation of the gear, the scattered grease tends to adhere to the surface of the drive belt. Therefore, as a gear of the group of gears disposed facing the surface of the drive belt, the internally toothed gear having the teeth lubricated with grease can prevent adhesion of grease to the drive belt.

Aspect 3.

In either Aspect 1 or Aspect 2, the internally toothed gear is disposed adjacent to the drive belt such as the conveyance timing belt 73.

Accordingly, as described in the examples above, if the grease that is applied to a gear disposed adjacent to the drive belt such as the conveyance timing belt 73 is sprayed or scattered around due to the centrifugal force exerted by rotation of the gear, the scattered grease tends to adhere to the surface of the drive belt. Therefore, as a gear of the group of gears disposed adjacent to the drive belt, the internally toothed gear having the teeth lubricated with grease can prevent adhesion of grease to the drive belt.

Aspect 4.

In any of Aspect 1 through Aspect 3, one axial end side of the internally toothed gear such as the developing internally toothed gear 55 is closed and the internally toothed gear is a helical gear to exert a thrust force to the one axial end side of the internally toothed gear.

Accordingly, as described in the examples above, the grease applied to the internally toothed gear is conveyed to the one axial end side of the internally toothed gear due to the thrust force exerted to the one axial end side. Consequently, the grease that is applied to the internally toothed gear can be prevented from being sprayed or scattered from an open end of the internally toothed gear.

Aspect 5.

In any of Aspect 1 through Aspect 4, an outer circumferential surface of the internally toothed gear such as the developing internally toothed gear 55 is in contact with a surface of the drive belt such as the conveyance timing belt 73 with taut. In other words, the outer circumferential surface of the internally toothed gear contacts the surface of the drive belt, so that tension is applied to the drive belt.

Accordingly, as described in the examples above, when compared with a different configuration in which another member to apply tension to the drive belt is employed in addition to the internally toothed gear such as the developing internally toothed gear 55, the number of parts and components can be decreased, and therefore a reduction in production cost of an image forming apparatus (for example, the image forming apparatus 100) can be achieved. Further, by applying tension to the drive belt, if a timing belt is employed as the drive belt, the meshing of each pulley and the drive belt becomes better and enhanced, and therefore preferable drive transmission can be performed. Further, if a V-belt is employed as the drive belt, a contact ratio of the drive belt and each pulley increases, and therefore a frictional force generated between the drive belt and each pulley also increases. As a result, preferable drive transmission can be achieved.

Aspect 6.

In any of Aspect 1 through Aspect 5, the drive belt is a V-belt.

Accordingly, a driving force can be transmitted by the frictional force that is generated between the drive belt and each pulley.

Aspect 7.

In any of Aspect 1 through Aspect 5, the drive belt is a timing belt.

Accordingly, a driving force can be transmitted by the gear meshing of the drive belt and each pulley.

Aspect 8.

In any of Aspect 1 through Aspect 7, an image forming apparatus (for example, the image forming apparatus 100) includes the drive transmitter (for example, the drive device 50 and the color developing drive device 150).

Accordingly, as described in the examples above, noise of the image forming apparatus can be reduced or prevented. Therefore, banding or other image defects caused by deterioration of rotation accuracy of the gears due to vibration of the drive transmitter can be reduced or prevented.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image forming apparatus comprising:
a plurality of image forming units, each integrally including at least one of an image bearer, a developing roller, a charger, and a cleaning device;
an intermediate transfer body;
a drive source including an output gear and configured to apply a driving force;
a drive rotary body including
a cylindrical body with one end open and an opposite end closed,
an internal tooth part mounted on an inner circumferential surface of the drive rotary body and directly meshed with the output gear of the drive source, and
an external tooth part mounted on an outer circumferential surface of the drive rotary body;
a drive transmitting member including an external tooth part and a pulley, the external tooth part of the drive transmitting member being meshed with the external tooth part of the drive rotary body;
a first belt;
a first drive output member including a first pulley to stretch the first belt between the first pulley and the pulley of the drive transmitting member, the first drive output member being configured to be drivingly connected to a first developing roller;
a second drive output member including an external tooth part meshed with the external tooth part of the drive rotary body, and a second pulley, the second drive output member being configured to be drivingly connected to a second developing roller;
a second belt; and
a third drive output member including a third pulley to stretch the second belt between the third pulley and the second pulley of the second drive output member, the third drive output member being configured to be drivingly connected to a third developing roller,
the first belt and the second belt being disposed near the drive rotary body.

2. The image forming apparatus according to claim 1, wherein an outer diameter of the pulley of the drive transmitting member is smaller than an outer diameter of the external tooth part of the drive transmitting member, and an outer diameter of the second pulley of the second drive output member is smaller than an outer diameter of the external tooth part of the second drive output member.

3. The image forming apparatus according to claim 1, further comprising:

a first tightener disposed in contact with the first belt; and a second tightener disposed in contact with the second belt.

4. The image forming apparatus according to claim 1, wherein the first drive output member includes a first drive coupling integrally formed with the first pulley, wherein the first drive coupling is configured to be connected to a first driven coupling that is mounted on the first developing roller to transmit the driving force of the drive source to the first developing roller;

the second drive output member includes a second drive coupling integrally formed with the second pulley, wherein the second drive coupling is configured to be connected to a second driven coupling that is mounted on the second developing roller to transmit the driving force of the drive source to the second developing roller; and the third drive output member includes a third drive coupling integrally formed with the third pulley, wherein the third drive coupling is configured to be connected to a third driven coupling that is mounted on the third developing roller to transmit the driving force of the drive source to the third developing roller.

5. The image forming apparatus according to claim 1, wherein a meshing position at which the output gear of the drive source and the internal tooth part of the drive rotary body are meshed with each other is closer to the first developing roller than a meshing position at which the external tooth part of the drive rotary body and the external tooth part of the drive transmitting member are meshed with each other, in an axial direction of the drive rotary body.

6. The image forming apparatus according to claim 1, wherein a meshing position at which the output gear of the drive source and the internal tooth part of the drive rotary body are meshed with each other is closer to the second developing roller than a meshing position at which the external tooth part of the drive rotary body and the external tooth part of the second drive output member are meshed with each other, in an axial direction of the drive rotary body.

7. The image forming apparatus according to claim 6, wherein a meshing position at which the output gear of the drive source and the internal tooth part of the drive rotary body are meshed with each other is closer to the first developing roller than a meshing position at which the external tooth part of the drive rotary body and the external tooth part of the drive transmitting member are meshed with each other, in an axial direction of the drive rotary body.

8. The image forming apparatus according to claim 1, wherein the first developing roller, the second developing roller, and the third developing roller are configured to form respective color images.

* * * * *